United States Patent
Soane et al.

[11] Patent Number: 6,099,283
[45] Date of Patent: Aug. 8, 2000

[54] APPARATUS FOR FORMATION OF ON-SITE COATED AND TINTED OPTICAL ELEMENTS

[75] Inventors: David S. Soane, Piedmont; Theodore Lance Parker, Danville; Travis David Boone, Oakland, all of Calif.

[73] Assignee: 2C Optics, Inc., Alpharetta, Ga.

[21] Appl. No.: 09/050,481

[22] Filed: Mar. 30, 1998

Related U.S. Application Data

[62] Division of application No. 08/372,549, Jan. 13, 1995, Pat. No. 5,733,483.

[51] Int. Cl.⁷ ..................................................... B29D 11/00
[52] U.S. Cl. ........................... 425/123; 249/115; 425/127; 425/808
[58] Field of Search .................... 425/117, 123, 425/127, 174.4, 808; 249/115

[56] References Cited

U.S. PATENT DOCUMENTS

| | | | |
|---|---|---|---|
| 4,061,518 | 12/1977 | Burroughs et al. | 156/232 |
| 4,774,035 | 9/1988 | Carmelite et al. | 264/1.7 |
| 5,049,321 | 9/1991 | Galic | 264/1.7 |
| 5,096,626 | 3/1992 | Takamizawa et al. | 264/1.7 |
| 5,110,514 | 5/1992 | Soane | 264/22 |
| 5,114,632 | 5/1992 | Soane | 264/22 |
| 5,160,668 | 11/1992 | Imus | 264/1.7 |
| 5,204,126 | 4/1993 | Singh et al. | 249/115 |
| 5,275,372 | 1/1994 | Boeckeler | 249/134 |
| 5,405,557 | 4/1995 | Kingsbury | 264/1.7 |

*Primary Examiner*—Robert Davis
*Assistant Examiner*—Thukhanh T. Nguyen
*Attorney, Agent, or Firm*—Needle & Rosenberg, P.C.

[57] ABSTRACT

Disclosed herein is a method and apparatus for forming on-site tinted and coated optical elements from a mold. The apparatus is a mold having a polymer release layer; an optical coating, such as an anti-reflective coating; a coupling agent layer to bind to the optical coating and having unreacted chemical groups; and, optionally, a tinted hard coat layer having unreacted chemical groups. The mold can be shipped to a lab that prepares optical elements, such as ophthalmic lenses, after the coupling agent layer is added or after the tinted hard coat layer is added. When using the mold with a lens resin having unreacted chemical groups, the coupling agent layer, tinted hard coat layer and optical element all crosslink as the optical element is cured to form, on-site, a durable and stable lens with chemically bound optical coatings.

19 Claims, 1 Drawing Sheet

APPARATUS FOR FORMATION OF ON-SITE COATED AND TINTED OPTICAL ELEMENTS

This application is a divisional of, and claims the benefit of, application Ser. No. 08/372,549, filed Jan. 13, 1995, now U.S. Pat. No. 5,733,483, which application is hereby incorporated herein by reference.

BACKGROUND OF THE INVENTION

1. Field of the Invention

This invention relates to a method and apparatus for forming optical elements and more particularly to a method for forming from a mold, optical elements having an optical coating and a tinted hard coat layer.

2. Previous Art

Optical elements having optical coatings are useful in a number of ways. For example, eyeglasses in which the ophthalmic lenses have been provided with optical coatings have several advantages. If the optical coating is a dielectric stack, or a multilayer anti-reflective coating, then eyestrain to the wearer can be reduced. This is achieved by reducing reflections off the inside surface of the lenses caused by light emanating from a source behind or to the side of the wearer. Anti-reflective coatings can also reduce the effect of ghost images which are caused by duplicate reflections off the inside and outside surfaces of the lenses. In addition, the cosmetic appearance of the eyeglasses is improved by making it possible for the observer to see the eyes of the wearer of the eyeglasses, instead of reflected images from the outer surface of the lenses. Ideally, the ophthalmic lens should be invisible to the observer. Reducing reflection promotes this effect.

The general method followed by a lab for forming optical elements by replication from a mold and cured under an ultraviolet lamp (UV lamp) is well known and fully described in two U.S. Pat. No. 5,110,514, Controlled Casting of a Shrinkable Material, issue date May 5, 1992 and U.S. Pat. No. 5,114,632, Controlled Casting of a Shrinkable Material, issue date May 19, 1992 herein incorporated by reference. Several businesses and individual optometrists have labs on their premises and advertise one hour service for most eyeglasses. Currently, these labs do not have the capability to add optical coatings which must be high vacuum vapor deposited to the lenses after they are made. Therefore, ophthalmic lenses must be shipped to a different facility which can provide such optical coatings, requiring extra expense and up to an additional week in waiting time for the customer. Additionally, high vacuum vapor deposition of coatings coheres to the lenses through physical adhesion and is scratched and/or removed easily with normal use and cleaning.

Another difficulty lies in adding both the competing yet desirable characteristics of a hard coat to the lens for scratch resistance and a tinted coat to absorb transmitted light. After manufacture, a hard coat that can be highly crosslinked is spun onto the outside of a pre-made lens making the outer surface very hard after curing. If the wearer requests tinting, the tintable coating must be spun onto the inside of the pre-made lens because the inside is softer and will absorb the dye. However, because the nature of the adhesion of these coatings is physical, the wearer may damage the coatings through normal use and cleaning.

U.S. Pat. No. 4,061,518, Method for Making an Article Having Replicated Coating with Durable Dielectric Overcoat, issue date Dec. 6, 1977, discloses a method for making an article having a replicated coating with a durable dielectric overcoat. The silicon parting compound, or release layer, is vapor deposited. An optical coating is formed on the coated surface while in the vacuum under a low temperature to cause initial curing of the protective coat without reevaporation of the silicon oil. Thereafter, the optical coating on the master is post-cured in air at an elevated temperature to cause final curing and hardening of the protective coat. After the post-curing has been completed, the replicated part is mounted by a sealing plastic.

U.S. Pat. No. 5,160,668, Method for Forming Optical Elements Having an Optical Coating by Replication of a Mold, issue date Nov. 3, 1992, discloses a method for forming from a mold, optical elements having an optical coating. The method includes high vacuum vapor depositing a release material and an optical coating onto the mold and then adding liquid resin and thermal curing the optical element. High vacuum vapor deposition is expensive. Additionally, even though the optical coating adheres preferentially to the surface of the optical element, the physical adhesion is not strong enough to protect the anti-reflective coat from being scratched and/or removed during normal use and cleaning. Additionally, this disclosure does not solve the problem of the competing characteristics of scratch resistance and tintability.

What is needed is a method and apparatus which will provide on-site formation of completed optical elements having durable optical coatings and a tinted hard coat layer, thereby significantly reducing required handling time and costs.

What is also needed is a method and apparatus for preparing optical elements which permit the transfer of optical coatings and a tinted hard coat layer to the optical element at a different location and time than the deposition of these coatings onto the mold used for forming the optical element.

What is also needed is a method and apparatus which uses a chemical coupler in order to better extract the optical coatings from the mold and to make the optical coatings and optical element more durable than is possible with current technology.

SUMMARY OF THE INVENTION

It is an object of this invention to provide a method and apparatus for on-site formation of completed optical elements having durable optical coatings and a tinted hard coat layer, thereby significantly reducing required handling time and costs.

It is an additional object of this invention to provide a method and apparatus for preparing optical elements which permit the transfer of the optical coatings and tinted hard coat layer to the optical element at a different location and time than the deposition of these coatings onto the mold used for forming the optical element.

It is an additional object of this invention to provide a method and apparatus which uses a chemical coupler in order to better extract the optical coatings from the mold and to make the optical coatings and optical elements more durable than is possible with current technology.

In accordance with the above objects and those that will be mentioned and will become apparent below, the method for forming from a mold an optical element having an optical coating and a tinted hard coat layer thereon, comprises the steps of:

depositing a release layer upon the mold;

depositing the optical coating upon the release layer;

depositing a coupling agent layer upon the optical coating;

baking the mold;

supplying liquid optical material to the mold and in contact with the tinted hard coat layer; and curing the liquid optical material.

In a preferred embodiment a hard coat layer is deposited upon the coupling agent layer after baking the mold.

In an additional preferred embodiment the hard coat has a tint.

In an additional preferred embodiment, the release layer is a polymer.

In an additional preferred embodiment the optical coating is a dielectric stack.

In an additional preferred embodiment the optical coating is a multilayer anti-reflective coating.

In an additional preferred embodiment the coupling agent layer is an organo silane.

In an additional preferred embodiment, after the coupling agent layer is deposited and baked, the mold is stored for shipping, handling and later use, whereby upon use, the method for forming the optical element is completed.

In another embodiment, the mold is partially cured by ultraviolet radiation after the tinted hard coat layer is deposited. After curing, the mold is stored for shipping, handling and later use, whereby upon use, the method for forming the optical element is completed.

It is an advantage of this invention to provide on-site formation of completed optical elements having durable optical coatings and a tinted hard coat layer, thereby significantly reducing required handling time and costs to the customer.

It is an additional advantage of this invention to provide a method and apparatus for preparing optical elements which permit the transfer of optical coatings and a tinted hard coat layer to the optical element at the lab of the business or individual optometrist, which is a different time and place than the deposition of these coatings onto the mold used for forming the optical element.

It is an additional advantage of this invention to provide a method and apparatus which uses a chemical coupler in order to better extract the optical coatings from the mold and to make the optical coatings and optical elements more durable than is possible with current technology.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
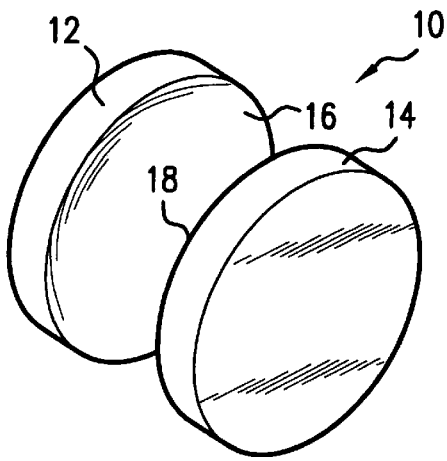
FIG. 1 is a perspective view of a mold having a front half and a back half utilized for making an optical element such as an ophthalmic lens in accordance with the present invention.

With respect to FIG. 1, there is shown the apparatus of the invention, an optically coated mold, generally indicated by the numeral 10. The mold 10 comprises a front half 12 and a back half 14. Each half has a polished surface 16 and 18, respectively, which is to be replicated. The polished surfaces 16 and 18 are sufficiently hard and inert to withstand ultraviolet radiation curing. The polished surfaces 16 and 18 are generally free of oil and large dust particles. The mold 10 can be formed of any suitable material which is transparent to the ultraviolet radiation hereinafter utilized in conjunction with the method and which can provide polished surfaces of the type required for the optical element being prepared. In this example, the mold 10 is made of an ultraviolet radiation transparent (UVT) grade of acrylic (polymethylmethacrylate, or PMMA). The desired optical coatings can be applied in any desired combination to each half of the mold 10. In the following illustration, all coatings are applied to both the convex and concave halves 12 and 14 in the following order.

Figure 2:
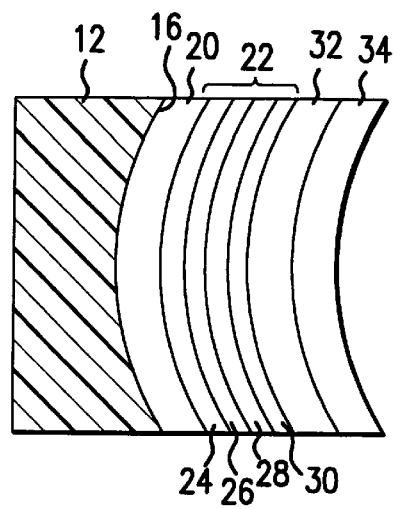
FIG. 2 is a cross sectional view of the front mold and coatings formed thereon.
Figure 4:
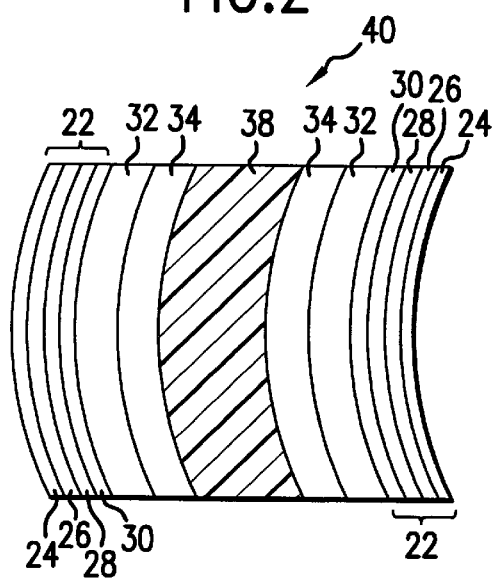
FIG. 4 is a cross sectional view of the optical element after transfer of the optical coatings thereon.
Figure 5:
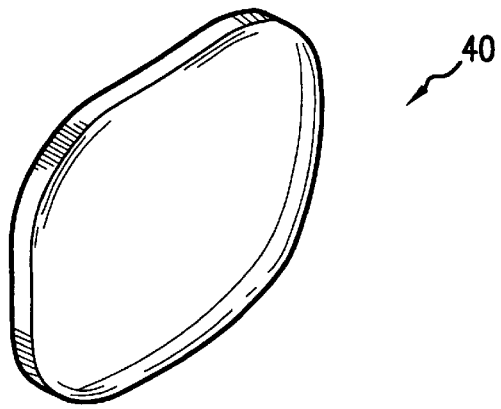
FIG. 5 is a perspective view of the optical element formed from the assembly shown in FIG. 3 with the edges ground to form an ophthalmic lens.

FIG. 2 is a cross sectional view of a set of preferred coatings of the present invention on the front half 12. A first single coating is deposited upon the polished surface 16 of the front half 12 for forming a release layer 20. The release layer 20 is a polymer, and has three embodiments. In a first embodiment, the release layer 20 is non-toxic and water soluble. In this case, the release layer 20 may be polyacrylicacid (PAA), or polyethyleneoxide (PEO), or, poly(N-vinylpyrrolidinone) (PNVP), or, polyvinylalcohol (PVA). Polyacrylamide (PAM) also works well, but is toxic in liquid form. These compounds adhere weakly to both the polished surface 16 of the mold 10 and to the optical coating to be deposited thereon. This weak adherence provides successful separation of the completed optical element having the desired optical coatings (as shown in FIGS. 4 and 5, generally indicated by the numeral 40) from the mold 10. It also provides quick, easy and safe rinsing of the mold 10 and of the completed optical element 40, after the completed optical element 40 is removed.

These solutions are prepared by dissolving 3–5% of the polymer in 80/20 water/isopropyl alcohol or 60/40 water/methanol. In both cases, the alcohols improve the wettability of the polymer solution on the mold 10. These solutions are then applied to the polished surface 16 by spin, dip, or flow coating.

For spin coating, the solution is applied at 100–300 rpm in a spin coater, a generic machine using a turntable. Uniform coatings can only be achieved by applying the solution radially with a syringe or pipette to form a continuous sheet of coating prior to spinning at a higher speed. The mold 10 is then spun by ramping up from 120 to 1500 rpm for 5–10 seconds. The exact spin procedure is unique to each solution due to viscosity and wettability differences. In each case, the procedure is customized to achieve a very uniform coating 1–5 microns in thickness.

When dip coating, the mold 10 is lowered into a reservoir of the polymer solution for 1–30 seconds, and then raised out of the reservoir at a draw rate of 4–12 in/min. Again the optimum draw rate to produce uniform drip-free coating is unique to each solution.

For flow coating, the mold 10 is positioned horizontally and the polished surface 16 is entirely covered with a large drop of solution. The mold 10 is then positioned vertically allowing excess fluid to run off.

Following spin, dip or flow coating, the mold 10 is air dried overnight or vacuum oven dried for 1 hour at 50° C., producing a coating over the polished surface 16 which is dry to the touch.

In a second embodiment, the polymer can be non-water soluble and ultraviolet radiation (UV) curable. These polymers form a hard, reusable release layer 20. No rinsing is necessary after the removal of the completed optical element 40 because the release layer 20 stays attached to the polished surfaces 16 and 18 and lets the desired optical coatings go to the cured optical material 38 (as shown in FIG. 4). Furthermore, the hard, crosslinked release layer 20 provides the polished surfaces 16 and 18 with scratch resistance. Under these conditions, the mold 10 can be used on average of 25 times, after which a new release layer 20 may be deposited and cured. Non-water soluble release layer 20 polymers can be polybutadiene-diacrylate (PBD-DA), polyethylene glycol-diacrylate (PEG-DA) or a highly crosslinked acrylate disclosed in U.S. patent application, Ser. No. 08/309,998, Plastic Molds for Ophthalmic Devices, filed Sep. 20, 1994 and now U.S. Pat. No. 5,551,663, herein incorporated by reference.

These solutions are prepared by adding a photoinitiator at 0.1–2% to PBD-DA or PEG-DA. To facilitate spin coating, PBD-DA and PEG-DA solutions are diluted to a 80/20 diacrylate/isobornyl-acrylate composition. Isobornyl-acrylate lowers the viscosity and will chemically bond into the crosslinked diacrylate network. PEG-DA can also be used without isobornyl-acrylate, as these solutions are inviscid enough to spin coat.

For spin coating, the solution is applied at 100–300 rpm to the mold 10. Again, very uniform coatings are achieved by applying the solution radially with a syringe or pipette to form a continuous sheet of coating prior to spinning at a higher speed. The mold 10 is then spun by ramping up from 120 to 1500 rpm for 5–10 seconds, resulting in a 1–5 micron coating. The mold 10 is then immediately UV-cured under nitrogen for 30–60 seconds under a 300 Watts/in UV lamp.

In a third embodiment, the polymer can be a commercial mold release, for example, Dow-Corning 20 Release, composed of silicon and xylene. It is spin coated as described above. The mold 10 is then vacuum oven-dried for 20 minutes at 75° C. The resulting coating is dry, but slippery to the touch.

When the release layer 20 is spin deposited or deposited by dipping, the thickness of the layer can be varied on the order of microns. It is important to obtain complete coverage of the polished surfaces 16 and 18 to allow even separation of the subsequent optical coatings from the polished surfaces 16 and 18. It is advantageous to use spin deposition or deposition by dipping to minimize expenses of manufacture.

As also seen in FIG. 2, the optical coating is applied on top of the release layer 20. In general, the optical coating is an inorganic dielectric stack. In this example, the optical coating is a multilayer anti-reflective coating 22, high vacuum vapor deposited upon the release layer 20. The multilayer anti-reflective coating 22 can be of a conventional type, as discussed, for example, in U.S. Pat. No. 5,160,668, Method for Forming Optical Elements Having an Optical Coating by Replication of a Mold, issue date Nov. 3, 1992, herein incorporated by reference. In this example, the multilayer anti-reflective coating 22 is comprised of four layers 24, 26, 28 and 30, which are deposited in a reverse order (as shown in FIG. 2), that they will have on the cured optical material 38 (as shown in FIG. 4). Materials found to be suitable for this purpose are titanium oxides and silicon oxides. Typically the layers 24, 26, 28 and 30 have thicknesses of about 100 Å to about 1100 Å. The multilayer anti-reflective coating 22 forms a highly crosslinked polymer that is almost as hard as glass.

As also seen in FIG. 2, a second single coating is deposited upon the multilayer anti-reflective coating 22 for forming a coupling agent layer 32. Without this chemical coupler, a coated lens will have patches of ion extracted optical coatings. Numerous types of coupling agents can be used, some are commercially available. The coupling agent has a siloxy head to react with the inorganic dielectric layer. The siloxy compound may have any acrylate tail that is capable of bonding into another acrylate matrix. In FIG. 2, the coupling agent layer 32 is an organo silane coating, and may be a methacrylic or acrylic group coating. More specifically, the coupling agent layer 32 may be composed of a member of the family sharing the characteristics of methacryloxypropyltrimethoxysilane. Subsequent baking causes hydrolysis reactions which chemically bond the siloxy groups of the coupling agent layer 32 to the surface of the inorganic multilayer anti-reflective coating 22. Chemical bonds are covalent and are about an order of magnitude stronger than physical adhesions. These chemical bonds significantly increase the durability and stability of the multilayer anti-reflective coating 22 to the cured optical material 38. The coupling agent layer 32 is necessary for chemical bonding of the multilayer anti-reflective coating 22, otherwise, there would be merely physical adhesion of the multilayer anti-reflective coating 22, which is easily removed with normal use and cleaning of a lens.

When the optical element is an ophthalmic lenses, the coupling agent layer 32 can be spin deposited, deposited by dipping or wiped on. One method of wiping on the coupling agent layer 32 is to follow the protocol furnished by the supplier of methacryloxypropyltrimethoxysilane. This method entails making a mix of 95% ethanol and 5% water, adjusting the pH of the solution to 4.75 with acetic acid, adding silane to a concentration of about 3%, stirring, dipping the mold 10 into the solution for 3 minutes, rinsing the mold 10 for 10 seconds in 100% ethanol and drying in a vacuum oven for one half hour at 80° C. Alternatively, the coupling agent layer 32 is purchased, and is used directly from the bottle. It is wiped onto the mold 10 with a lint free towel, and baked in a vacuum oven for one hour at 50° C. The width of the coating is not critical, but must closely follow the contour of the polished mold surfaces 16 and 18 to reproduce the features of the polished surfaces 16 and 18 for precise replication. It is advantageous to use spin or wipe deposition or deposition by dipping to minimize expenses of manufacture.

As also seen in FIG. 2, a third single coating is deposited upon the coupling agent layer 32 for forming a hard coat layer 34. The hard coat layer 34 is a highly crosslinked polymer that becomes almost as hard as glass and extremely scratch resistant. The hard coat 34 may be tinted. The tinted hard coat layer 34 consists of a tinting material and a primer.

Tinting materials may be organic or inorganic dyes or pigments, photochromic materials, metallic particles, and the like. Six dyes and pigments include but, are not unlimited to, Orasol Brown 2GL, 70 Savinyl Dark Violet R, Methyl Violet B Base, Sudan Black B, Methyl Violet ZB, Oil Red O, Fat Brown RR, Orasol Orange RG, Orasol Blue GN, Zapon Brown 287, Zapon Red 335, Zapon Black X51, Orasol Black RLI and Oil Red EGN. Exemplary pigments include Cromophtal Yellow 8G, Cromophtal Yellow 3G, Cromophtal Yellow GR, Cromophtal Scarlet R, Cromophtal Brown 5R, Cromophtal Red 3B, Cromophtal Violet B, Cromophtal Blue 3R, Irgazin Yellow 2GLTE, Irgazin Yellow 3RTLN. Organic pigments which are particularly stable to UV light are in the Irgalite yellows: LBT, LBIW; Irgalite rubins: L4BY, L4BN, LPBC; and Irgalite blues: LGLB, BCFR, GLSM, and GLA. Other useful pigments are Irgalite rubin L4BF, Irgalite blue LG and GLG and Irgalite red RBS, L2BN and 3RS. Pigment preparations known as Microlith WA (soluble in N-vinyl-2-pyrrolidone); Microlith T (slightly soluble in acrylic acid esters and methyacrylic acid esters); and Microlith K (slightly soluble in MMA and other low molecular weight polymers), are useful. A preferred pigment preparation is Microlith T.

Primers contain combinations of alkane polyols, polyacrylated urethane, polyacryloylated alkane polyols, mono vinyl functional reactive diluent, and photoinitiators. A first class comprises twenty to seventy parts of alkane polyols, wherein the alkane polyols contain up to about forty eight carbon atoms and average at least three O-(acryloyl-(polyalkylene oxide)) chains; wherein each of the polyalkylene oxide chains comprise form one to twenty alkylene oxide groups; fifteen to seventy five parts of a polyacrylated urethane, wherein the urethane has a molecular weight of about 2500 or less and an average of at least three acrylate groups; a tinting material selected from dyes, pigments and mixtures thereof in an amount sufficient to provide the transmission of a predetermined amount of the incident light, and to impart a predetermined color; and optionally, twenty to seventy parts of polyacryloylated alkane polyols, wherein the alkane polyols contain an average of at least three O-acryloyl groups; optionally, one to twenty five parts of a mono vinyl functional reactive diluent.

A second class comprises the first class plus a photoinitiating amount of a photoinitiator, typical one tenth to about six parts, as well as optional dyes, surfactants and stabilizers.

A third class comprises thirty to eighty parts of an acrylated material which promotes adhesion of the cured primer coating to the substrate; one to seventy parts of a mono vinyl functional reactive diluent; and optionally, one to fifty parts of alkane polyols, wherein the alkane polyols contain up to about forty eight carbon atoms and average at least two O-(acryloyl-(polyalkylene oxide)) chains; wherein each of the polyalkylene oxide chains comprise from one to twenty alkylene oxide groups; optionally, a tinting material selected from dyes, pigments and mixtures thereof in an amount sufficient to provide the transmission of a predetermined amount of the incident light, and to impart a predetermined color.

The tint is incorporated into the primer by holding the primer at a temperature between 20 and 60° C. such that the viscosity is below about 500 cps. Sufficient dye is added to give a solution of the desired absorbency, generally 0.1 to 5.0 percent by weight. The dye is dissolved with stirring over a period of about an hour. The warm solution is pressure filtered through a frit with pore size of 0.8 micron or less, then allowed to cool to ambient temperature.

The tinted hard coat layer 34 can be spin deposited with the spin coater. The speed of the spin coater controls the thickness of the hard coat, enabling the operator to tint the lens to any desired intensity to control the transmission loss, i.e., the intensity of the incident light reduced. Alternatively, the tinted hard coat layer 34 can be deposited by dipping. The width of the coating is not critical, but must closely follow the contour of the polished mold surfaces 16 and 18 to reproduce the features of the polished surfaces 16 and 18 for precise replication. It is advantageous to use spin deposition or deposition by dipping to minimize expenses of manufacture and control tint intensity.

Table 1 illustrates the maximum absorbed wavelengths and Mac Beth transmission values for eleven examples of tinted hard coat layers that were spin deposited to varying thicknesses and with different dyes. Table 2 discloses the dye identification numbers.

TABLE 1

| SINGLE TINTED TOPCOAT EXAMPLE | SIDE COATED | COATING LAYER | COATING THICKNESS MICRONS | DYE ID # | SAMPLE MAXIMUM ABSORB WAVELENGTH nm | SAMPLE MACBETH TRANSM'N VALUE -DOT |
|---|---|---|---|---|---|---|
| 1 | FRONT | TOPCOAT | 4.6 | 17 | 550 | −88 |
| 2 | FRONT | TOPCOAT | 3.9 | 17 | 550 | −83 |
| 3 | FRONT | TOPCOAT | 2.9 | 17 | 550 | −73 |
| 4 | FRONT | TOPCOAT | 8.4 | 5 | 495 | −78 |
| 5 | FRONT | TOPCOAT | 5.7 | 5 | 495 | −65 |
| 6 | FRONT | TOPCOAT | 3.9 | 5 | 495 | −49 |
| 7 | FRONT | TOPCOAT | 16.4 | 9 | 598 | −31 |
| 8 | FRONT | TOPCOAT | 8.4 | 9 | 598 | −24 |
| 9 | FRONT | TOPCOAT | 5.7 | 9 | 599 | −17 |
| 10 | FRONT | TOPCOAT | 11.1 | 6 | 508 | −92 |
| 11 | FRONT | TOPCOAT | 5.7 | 6 | 509 | −73 |

TABLE 2

| DYE ID # | DYE NAME |
|---|---|
| 1 | ORASOL BLACK RLI |
| 3 | THERMAL PLAST BLUE 684 |
| 4 | ORASOL ORANGE RG |
| 5 | ORASOL BROWN 2GL |
| 6 | ZAPON RED 335 |
| 7 | OIL RED EGN |
| 9 | ORASOL BLUE GN |
| 10 | OIL RED O |
| 11 | ZAPON BROWN 287 |
| 12 | ZAPON BLACK X51 |
| 15 | DARK VIOLET |
| 17 | SUDAN BLACK |

If desired, this layer may then be cured using UV radiation. Curing may also be accomplished by mild heating at temperatures below the glass transition temperatures of the lens materials.

It is contemplated that the tinting dyes or pigments may be added to any layer on either side of the mold or not at all.

Figure 3:
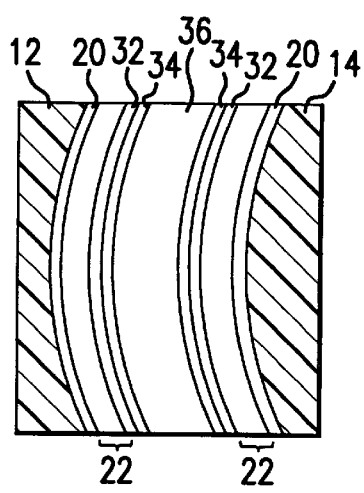
FIG. 3 is a perspective view of liquid optical material supplied into a mold.

FIG. 3 illustrates the next step: the desired liquid optical material 36 is supplied into the mold 10 and in contact with the tinted hard coat layer 34. In one embodiment, the liquid optical material 36 is a thermo-set. A thermo-set is a crosslinker that reacts as it solidifies, in this instance forming a network with the tinted hard coat layer 34 and the coupling agent layer 32 (which is chemically bound to the multilayer anti-reflective coating 22).

The thermo-set can be an acrylate resin, a mixture of multifunctional acrylates and urethanes. More specifically, it can be 1E Resin, an acrylate resin disclosed in U.S. patent application for Radiation Curable coating for Plastic Articles, Ser. No. 08/173,834, filed Dec. 23, 1993, allowed Dec. 30, 1994 herein incorporated by reference. 1E resin is an acrylated material having photoinitiating amounts of photoinitiators.

When ultraviolet radiation strikes the photoinitiators, the acrylate groups and/or methacrylate groups within the liquid optical material 36, the tinted hard coat layer 34 and the coupling agent layer 32 crosslink, making the cured optical material 38 and all of its coatings more durable and stable. In effect, the coupling agent layer 32 chemically stitches the liquid optical material 36 to the multilayer anti-reflective coating 22 (the AR stack). These strong chemical bonds increase the durability and stability of the multilayer anti-reflective coating 22 to the cured optical material 38, increase the durability and stability of the completed optical element 40 and increase the ability to remove the cured optical material 38 from the mold halves 12 and 14 with successful transfer of the multilayer anti-reflective coating 22, the coupling agent layer 32 and the tinted hard coat layer 34. Because each layer reacts with the other layers, the coatings according to the present invention are believed to have superior scratch resistance as well as containing a tint.

Next, the mold halves 12 and 14 are separated from the cured optical material 38 with separation occurring between the mold halves 12 and 14 and the multilayer anti-reflective coating 22 at the release layer 20. If the release layer 20 is water soluble, it is removed from the multilayer anti-reflective coating 22 of the cured optical material 38 by dipping in water or lightly rinsing in water. This dissolves any residual portions of the release layer 20, leaving the completed optical element 40 as shown in FIG. 4. If the release layer 20 is a cured polymer, all of it remains on the polished surfaces 16 and 18. The completed optical element 40 can now be ground for its required purpose, for example, to serve as an ophthalmic lens. If desired, the completed optical element 40 can be prepared as a single vision lens, bifocal, or a progressive lens. The completed optical element 40 is then ground to meet the requirements of the frames desired by the customer (as shown in FIG. 5) and mounted to provide the purchased product.

Two modifications of the above described method are of particular interest to businesses which, and individual optometrists who, have labs on their premises. These are discussed in detail in the following examples.

EXAMPLE 1

A first modification provides the most fused and strongest chemical bond network. After the coupling agent layer 32 is wiped onto the mold 10 with a lint free towel, and baked in a vacuum oven for one hour at 50° C., it is then sealed in a plastic bag with a small amount of desiccant for storing, shipping, handling and later use. The mold 10 is packed in a way to prevent nicking or marring of the surface to be replicated. There is no known limit to shelf life. Alternatively, the coupling agent layer 32 can be air dried.

When a business or individual optometrist uses the mold 10 in an on-site lab, the user spin or dip deposits the tinted hard coat layer 34 onto the mold 10 and then supplies the liquid optical material 36 into the mold halves 12 and 14 in contact with the wet tinted hard coat layer 34. When the liquid optical material 36 is cured in ultraviolet radiation, all unreacted acrylate and/or methacrylate groups in the coupling agent layer 32, the tinted hard coat layer 34 and the liquid optical material 36 crosslink, forming a network of chemical bonds. The tinted hard coat layer 34 forms both chemical bonds and physical adhesions with the coupling agent layer 32, however, the chemical bonds dominate because they are orders of magnitude stronger than physical adhesions. The completed optical element 40 is removed from the mold 10, the release layer 20 is rinsed off (if necessary) and the completed optical element 40 is ground to the desired shape.

EXAMPLE 2

The second modification of the above described method is to UV cure the mold 10 after the tinted hard coat layer 34 is deposited. The amount of tinted hard coat layer 34 deposited and the amount of curing affects the degree of crosslinking to the coupling agent layer 32 and later to the liquid optical material 36. Adjusting these parameters controls the amount of physical adhesion and the number of chemical bonds between the tinted hard coat layer 34, the coupling agent layer 32, and the cured optical material 38. The tinted hard coat layer 34 can be deposited as described earlier and surface cured in ultraviolet radiation for one to fifteen seconds at 0.1 to 1 Watts per square inch. Surface curing allows the tinted hard coat layer 34 to be dry enough for shipping, and causes some acrylate groups within the tinted hard coat layer 34 to react with acrylate and/or methacrylate groups of the coupling agent layer 32 to form a network of chemical bonds. This also allows some unreacted groups in the tinted hard coat layer 34 to be left available for future crosslinking with the liquid optical material 36.

The mold 10 is then sealed in a plastic bag with a small amount of desiccant for storing, shipping, handling and later use. The mold 10 is packed in a way to prevent nicking or marring of the surface to be replicated. There is no known limit to shelf life.

When a business or individual optometrist uses the mold 10, the user supplies the liquid optical material 36 in contact with the surface cured tinted hard coat layer 34. When the liquid optical material 36 is cured in ultraviolet radiation, the unreacted acrylate groups in the tinted hard coat layer 34 crosslink with acrylate groups in the liquid optical material 36. The tinted hard coat layer 34 forms both chemical bonds and physical adhesions with the cured optical material 38. Again, chemical bonds dominate because they are orders of magnitude stronger than physical adhesions. Furthermore, the amount of surface cure of the tinted hard coat layer 34 can be manipulated to vary the stability of the mold 10 for shipping and vary the number of chemical bonds between the coupling agent layer 32, the tinted hard coat layer 34 and the cured optical material 38.

Using the method of the present invention enables preparation of a coated optical element in one step, on-site, during casting. With this method and apparatus, all coatings crosslink together and with the cured optical material 38. Using the disclosed method and modification, each coating forms chemical bonds with the other coatings and with the cured optical material 38, making this optically coated and tinted optical element 40 more durable and stable than is possible with current technology. These chemical bonds make it more difficult for the user to damage the lens and/or remove the coatings during normal use and cleaning.

While the foregoing detailed description has described several embodiments of the method and apparatus for formation of on-site coated and tinted optical elements in accordance with this invention, it is to be understood that the above description is illustrative only and not limiting of the disclosed invention. It will be appreciated that the same techniques can be utilized for making other optical elements in addition to ophthalmic lenses, such as camera lenses, optics, contrast enhancement filters, display windows, instrument panels and data disks. The same techniques can be utilized for single or multilayer optical coatings for spectral control of transmission, reflection and absorption. Optical coatings may be used to reduce transmission of other wavelengths, for example, ultraviolet or infrared. When optical elements are made for more sensitive uses, high vapor vacuum deposition is preferred to deposition by dipping or spinning. It will also be appreciated that other forms of chemical bonds fall within the scope and spirit of this invention. For example, other types of liquid lens materials may form other types of chemical bonds with other types of optical coatings and release layers, also forming durable and stable optical elements. Thus the invention is to be limited only by the claims as set forth below.

What is claimed is:

1. An apparatus for applying an optical coating to an optical element during formation of the optical element, comprising:
    a mold, the mold having opposed faces for forming the optical element therebetween;
    the optical coating on at least one of the faces of the mold for applying the optical coating to the optical element; and
    a methacrylated or acrylated silane coupling agent layer over the optical coating for binding the optical coating to the optical element
    whereby the optical coating is attached to the optical element through the coupling agent in the mold.

2. The apparatus of claim 1, further including a release layer between the face of the mold and the optical coating for releasing the optical coating from the mold onto the optical element.

3. The apparatus of claim 2 further including a hard coat layer over the coupling agent layer.

4. The apparatus of claim 3 wherein the hard coat layer is tinted.

5. The apparatus of claim 1 further including the face of the mold having a tinted hard coat layer deposited over the coupling agent layer whereby when the optical element is formed, both the optical coating and the tinted hard coat layer are released from the mold onto the optical element.

6. The apparatus of claim 1 wherein the mold is formed of a material transparent to ultraviolet radiation.

7. The apparatus of claim 6 wherein the mold is formed of an ultraviolet radiation transparent grade of acrylic.

8. The apparatus of claim 2 wherein the release layer is a polymer.

9. The apparatus of claim 8 wherein the release layer is polyethylene glycol-diacrylate.

10. The apparatus of claim 2 wherein the release layer is a water soluble polymer.

11. The apparatus of claim 10 wherein the release layer is polyvinylalcohol.

12. The apparatus of claim 1 wherein the optical coating is a dielectric stack.

13. The apparatus of claim 1 wherein the optical coating is a multilayer anti-reflective coating.

14. The apparatus of claim 1 wherein the coupling agent layer is a member of the family of methacryloxypropyltri-methoxysilanes.

15. The apparatus of claim 1 wherein the coupling agent layer is chemically bound to the optical coating.

16. The apparatus of claim 4 wherein the tinted hard coat layer comprises:
    twenty to seventy parts of alkane polyols, wherein the alkane polyols contain up to about forty eight carbon atoms and average at least three O-(acryloyl-(polyalkylene oxide)) chains, wherein each of the polyalkylene oxide chains comprise form one to twenty alkylene oxide groups;
    fifteen to seventy five parts of a polyacrylated urethane, wherein the urethane has a molecular weight of about 2500 or less and an average of at least three acrylate groups;
    a tinting material selected from dyes, pigments and mixtures thereof in an amount sufficient to provide the transmission of a predetermined amount of the incident light, and to impart a predetermined color; and
    optionally, twenty to seventy parts of polyacryloylated alkane polyols, wherein the alkane polyols contain an average of at least three O-acryloyl groups;
    optionally, one to twenty five parts of a mono vinyl functional reactive diluent.

17. The apparatus of claim 16 wherein the tinted hard coat layer further comprises a photoinitiating amount of a photoinitiator, typical one tenth to about six parts, as well as optional dyes, surfactants and stabilizers.

18. The apparatus of claim 4 wherein the tinted hard coat layer comprises:
    thirty to eighty parts of an acrylated material which promotes adhesion of the cured primer coating to the substrate;
    one to seventy parts of a mono vinyl functional reactive diluent; and
    optionally, one to fifty parts of alkane polyols, wherein the alkane polyols contain up to about forty eight carbon atoms and average at least two O-(acryloyl-(polyalkylene oxide)) chains, wherein each of the polyalkylene oxide chains comprise from one to twenty alkylene oxide groups;
    optionally, a tinting material selected from dyes, pigments and mixtures thereof in an amount sufficient to provide the transmission of a predetermined amount of the incident light, and to impart a predetermined color.

19. The apparatus of claim 4 wherein the tinted hard coat layer is chemically bound to the coupling agent layer.

* * * * *